United States Patent [19]

Geldner

[11] Patent Number: 4,572,553
[45] Date of Patent: Feb. 25, 1986

[54] FLANGE CONNECTOR

[76] Inventor: Siegfried Geldner, Inntalstr. 3, D-8201 Reischenhart, Fed. Rep. of Germany

[21] Appl. No.: 686,685

[22] Filed: Dec. 27, 1984

[30] Foreign Application Priority Data

Dec. 30, 1983 [EP] European Pat. Off. ........ 83113251.9

[51] Int. Cl.$^4$ ............................................. F16L 23/00
[52] U.S. Cl. ..................................... 285/363; 285/424
[58] Field of Search ......................... 285/363, 424, 368

[56] References Cited

U.S. PATENT DOCUMENTS

| | | | |
|---|---|---|---|
| 4,123,094 | 10/1978 | Smitka | 285/424 X |
| 4,218,079 | 8/1980 | Arnoldt | 285/363 X |
| 4,252,350 | 2/1981 | Smitka | 285/363 |
| 4,410,206 | 10/1983 | Mez | 285/424 X |
| 4,447,079 | 5/1984 | Sullivan | 285/363 |
| 4,508,376 | 4/1985 | Arnoldt | 285/363 |
| 4,509,778 | 4/1985 | Arnoldt | 285/424 X |

FOREIGN PATENT DOCUMENTS

| | | |
|---|---|---|
| 0092110 | 10/1983 | European Pat. Off. . |
| 90469 | 6/1896 | Fed. Rep. of Germany . |
| 1650169 | 9/1970 | Fed. Rep. of Germany . |
| 2753446 | 5/1979 | Fed. Rep. of Germany ...... 285/363 |
| 2313425 | 8/1981 | Fed. Rep. of Germany . |

Primary Examiner—Thomas F. Callaghan
Attorney, Agent, or Firm—Orrin M. Haugen; Thomas J. Nikolai

[57] ABSTRACT

A flange connector for joining forced air duct sections together, consisting of angle bar members attached to the end edges of the duct sections, the cross-section of the angle bars feature parallel and perpendicular flanges that run parallel and perpendicular to the respective enclosing wall of the duct. The angle bar members are connected with corner fittings which feature two pin-like lugs situated perpendicular to each other. In order to maximize the bending strength of the flange connector as a whole, and of the bar members in particular, under conditions of least material usage and at the same time be able to use the flange connection for the joining of firm as well as of flexible duct sections and also maintaining an at least comparable sealing effect compared to existing standards, the cross-sections of the bar members are designed in such a way that the longitudinal outer edges of the flanges have recessed inwardly curled seams facing each other, and a groove at their common bending edge facing from the outer towards the inner section of the angle.

9 Claims, 9 Drawing Figures

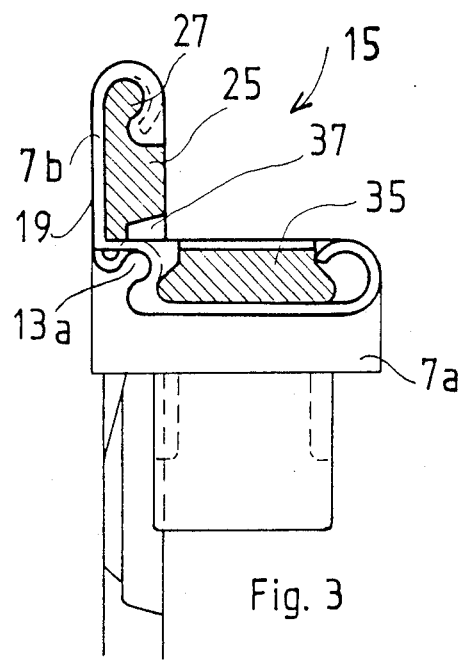
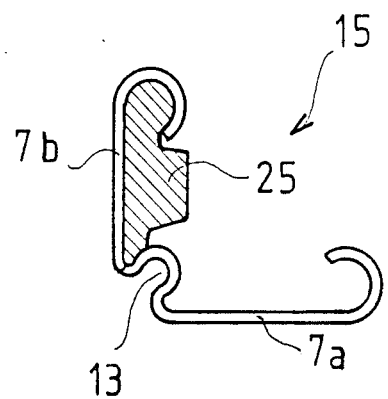
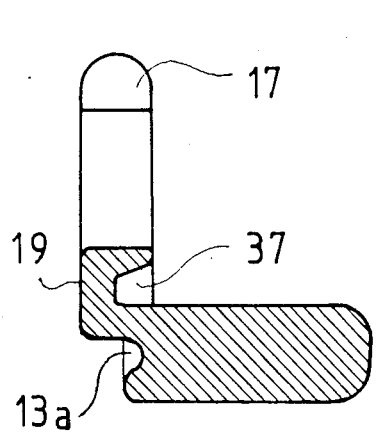
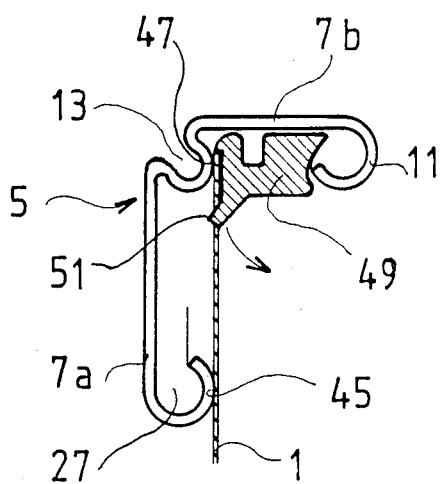

FLANGE CONNECTOR

BACKGROUND OF THE INVENTION

The instant invention relates to a flange connector used for joining of ducts having generally rectangular cross-sections, especially in high pressure air duct systems.

Such flange connectors are especially designed for use in assembling and anchoring the various sections of air ducts. As mentioned, the duct sections are normally rectangular and consist of sheet metal with four corner folds. To reduce the propagation of sound which is normally generated by air conditioning or ventilating units attached to the duct, it is common practice to insert a vibration damper in the form of a flexible connector between two duct sections being joined.

Such a flange connector is described in German patent publication DE-PS No. 23 13 425 which shows a frame made of angle bars attached to the front end of a duct section so that the two mutually perpendicular flanges of the angle bars run parallel and perpendicular to each wall of the duct respectively. The flanges also are designed to receive and anchor a rectangular corner fitting, which is used to connect two bar members to each other. The frame is then fixed to the front ends of the duct sections and can be flanged against a similar frame that is attached to the adjacent duct section whereby a rubber seal or the like is inserted between the two opposing flanges in order to eliminate air leaks and to inhibit transmission of sound vibrations.

These known angular bars, however, are costly because they have essentially double walls for each flange which in principle results in four walls. Considering that such angular bars meant to stabilize duct sections are normally manufactured out of steel, it is obvious that the abovementioned construction leads to high material usage and therefore to enormous material costs.

On the other hand, since the thin sheet metal walls of the duct sections do not have the generally required structural stability, a flange connector made of such angular bars lends rigidity to the duct. Therefore, it is not possible to eliminate the couplers and their attendant cost altogether.

Corner fittings used to join the angle bar members to a frame generally feature pin-like lugs which extend perpendicular to one another and which are adapted to be inserted between the double walls of one flange of the angular bar that extends perpendicular to the respective duct wall. These corner fittings are essentially punched out of sheet metal and would generally not allow the desired sealing effect at corner points between two adjacent duct sections. Therefore, more often than not, an elastomeric compound must be applied to the joint to establish an adequate seal which will avoid energy losses through air leaks.

Another disadvantage of such flange connectors is the difficulty in joining it to flexible connectors having flexible wall material, such as coated fabric, which is manufactured differently than the ones used for solid duct walls. The sealing problems associated with flexible material are just as severe. Finally, it is common practice to use a wider width of flange for air ducts of larger cross-sections and a narrower flange width for smaller ones. This necessitates the manufacturing and stocking of various sizes of angular bars which, in turn, increases cost.

SUMMARY OF THE INVENTION

It is therefore an object of the instant invention to provide an improved flange connector for air ducts which maintains a uniform bending strength of the flange connector and of its angle bar members while creating substantial material savings. The flange connector of the present invention also stabilizes and joins both solid wall and flexible wall ducts, without impairing the sealing effect as compared with existing techniques.

The instant invention provides an improved design of an angle bar that combines, for the first time, optimal stiffness and bending strength while minimizing material to thereby reduce its cost. This is achieved essentially through the use of two recessed inwardly curled seams running along the longitudinal outer edges of the angle bar and, furthermore, through the provision of a groove at the common fold-line defining the parallel and the perpendicular flanges. This leads to a maximum of fold-lines within a narrow area which, in turn, essentially contributes to the increased load carrying capability of the angle bar. Considering that the angle bars of the instant invention allow material savings of approximately 30% as compared with existing products, the cost saving factor becomes apparent, especially when steel is used as a basic material.

The increased bending strength is further enhanced by the improved design of the recessed, inwardly curled seams of the longitudinal outer edges of the angle bars. These outer edges are preferably semicircular in shape, and, furthermore, the above-mentioned groove at the common fold-line of the two flanges, which is situated symmetrically to the bisecting line of the angle also has a semicircular shape. Due to its tube-like cross-section construction, the angle bar can withstand maximal loads.

The rigidity of the flange connector of the instant invention is further enhanced through the design of the corner fitting, which is no longer merely punched out of flat sheet stock as in the prior art, but instead, it now has pin-like lugs that plug into both the perpendicular flange and also into the parallel flange, as well. At the same time, the new corner fitting can be used just as well with the new angle bar for reinforcing and connecting both ducts with solid sheet metal walls and those whose walls are made of flexible material or fabric.

Another feature of the instant invention becomes apparent if the corner fitting is shaped in such a way that an elbow-like groove on its plane extending perpendicular to the duct wall is provided. This groove accommodates the front edge of the corner of the duct in an assembled position.

Furthermore, to increase the sealing effect in an economical way, it is an especially preferred feature of the instant invention that a groove be located at the common edge of the two planes of the two flanges for the accommodation of a sealing strip. It has proven advantageous to extend this elbow-like groove through the front planes of the corner fitting as well, so that when the flange connector, consisting of corner fittings and the angle bar members, is assembled in a frame-like way, the groove in the bar members and the circular groove in the corner fittings form a continuous slot all around the frame into which a one-piece sealing strip can be inserted to form a ring seal.

Another feature of the instant invention is the provision whereby the two perpendicular flanges of the angle bar members ae symmetric. This allows the angular and the lateral flange to be interchangeable, which means that if e.g. two different flange connectors each with a different flange width are needed, it is not necessary to manufacture two different angle bars, but instead, only one angle bar with a different width for the angular flange and a different one for the lateral flange may be manufactured and used as required. This, of course, eliminates at least one stock item in inventory as well as saving the cost for manufacturing one device.

To insure high bending strength and optimal sealing effect at the same time, the corner fitting may be manufactured as a die-casting or injection molded part of plastic or other suitable material. It may also consist of composite material such as fiber reinforced plastics.

Other and further objects of the present invention will become apparent to those skilled in the art upon a review of the following specification, appended claims and accompanying drawings.

DESCRIPTION OF THE DRAWINGS

FIG. 3 is a cross-sectional side view of the corner fitting and angle bar member taken along the line III—III in FIG. 2;

FIG. 4 is a cross-sectional side view of the corner fitting and angle bar member taken along the line IV—IV in FIG. 2;

FIG. 5 is a cross-sectional side view of the corner fitting taken along the line V—V in FIG. 2;

FIG. 6 is a side view of an angle bar mounted onto the edge of a firm duct wall with a clamping rod.

DESCRIPTION OF THE PREFERRED EMBODIMENT

Figure 1:
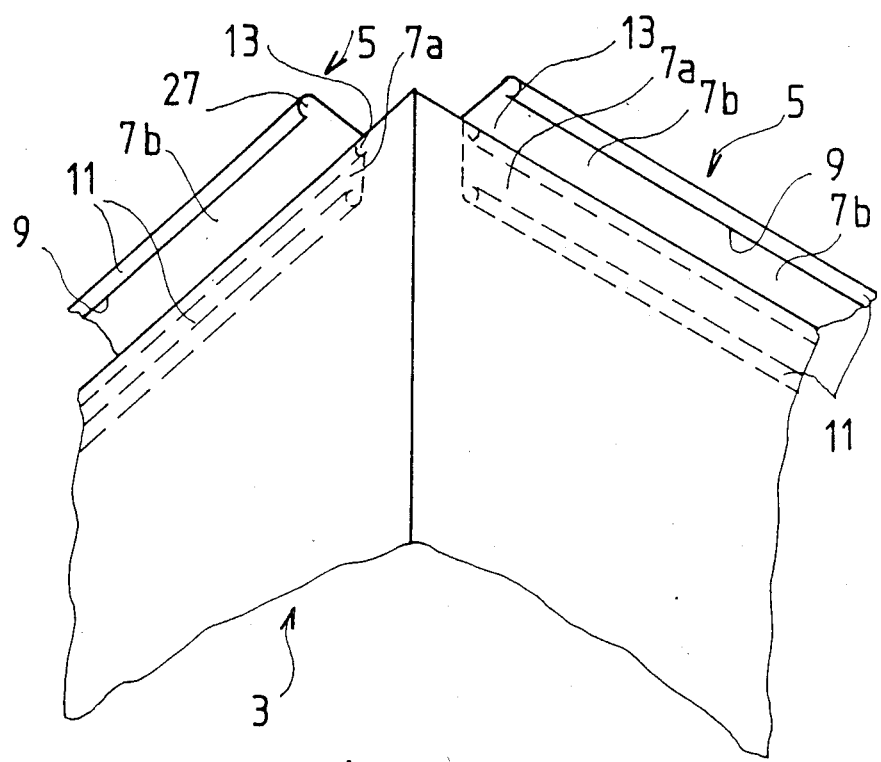
FIG. 1 is a partial perspective view of a corner portion of a sheet metal duct with an angle bar coupler mounted thereon.

Referring first to FIG. 1, there is shown a perspective view of a portion of a sheet metal duct, namely parts of its mutually perpendicular side walls. The duct walls may also consist of flexible material, such as coated fabric that is frequently used to block the transmission of soundwaves through the body of the duct.

The illustrated part of a duct in FIG. 1 has already been mounted with two angle bar connectors. The bar shows two flanges 7a and 7b with their planes set perpendicular to each other. Flange 7a runs parallel to the duct wall, while flange 7b runs perpendicular to the duct wall.

When fully assembled, adjacent duct sections are mounted with their ends abutting each other flat against the perpendicular flanges 7b.

Furthermore, FIG. 1 shows that the flanges 7a and 7b each have semicircular recessed seams 9 facing each other on both of their outer longitudinal edges. There is also an inwardly extending groove 13 running along the fold-line formed by the intersection of flanges 7a and 7b.

The two angle bar members 5 as shown in FIG. 1 are adapted to be joined at their common corner by a corner fitting as illustrated in FIGS. 2 to 5.

The corner fitting has a flange portion 17 that joins the two flanges 7b together around their common corner. The plane 19 of that same portion is in alignment with the front end plane of the perpendicular flanges 7b when assembled. There also may be a mounting hole in this area.

Two pin-like lugs 25 extend out of the edge planes 23 of the corner fittings that are located perpendicular to each oher, and form the male parts of a plug-in device that fits into the semicircular section of the recessed curled seam that forms a female plug-in slot in the perpendicular flanges 7b. The outer edge 29 of the male plug is shaped accordingly to form a tight friction fit.

The inner edges of the pin-like lugs 25 are shaped in a suitable way to provide a tight fit against the arch formed by the wall of the groove 13. This secures a tight fit of the corner fitting 15 into the angle bar member.

In addition to the above, each corner fitting has an upright post 33 extending perpendicular to the plane 19 and extending into two further pin-like lugs that plug into the recesses of the parallel flange 7a in a manner similar to the lugs 25 which plug into the recesses of the perpendicular flange 7b.

Figure 2:
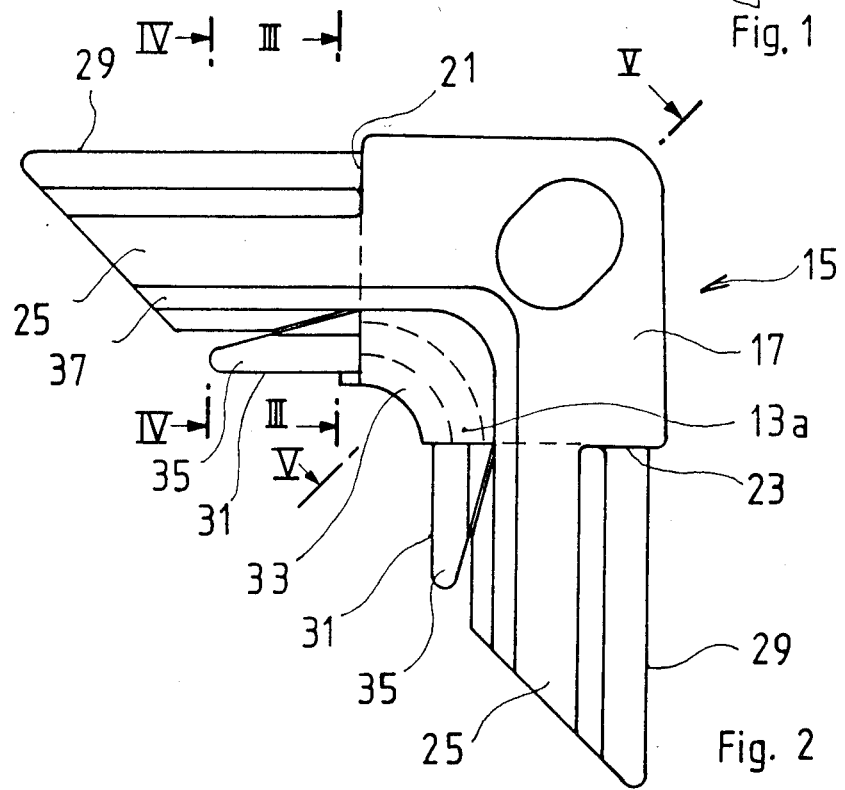
FIG. 2 is a top view of the corner fitting.

With reference to FIGS. 2, 3 and 5, there is an elbow-like groove 37 provided which is meant to receive the edge of a solid, sheet metal duct wall when the entire flange connector is assembled and mounted onto the front edges of a duct section, whereby the vertical post 33 together with its lugs 35 and flange members 7a slips into the inside of the duct enclosing walls, thus allowing the flange portion of the corner fitting 17 to extend, together with its pin-like lugs 25 and its flange members 27, perpendicular to the outside of the enclosing walls of the duct. However, the flange connector may also be fitted over the outside enclosing walls of the duct in a different arrangement, when needed.

Figure 7:
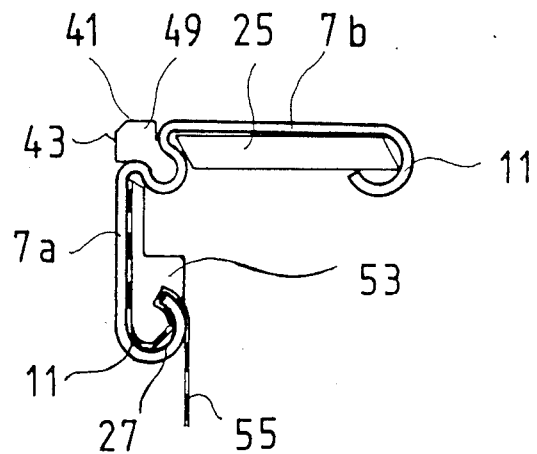
FIGS. 7-9 are partially sectioned side views of examples of clamping devices that fix flexible duct walls to the angle bars.

As shown in FIG. 7, the corner fitting also has a semicircular groove 13a, which is meant to extend the groove 13 of the angle bar members in partial alignment to receive an elastic seal 49 which essentially provides a sealing effect in two planes 41 and 43 and can be inserted as a continuous sealing strip running continuously around the frame structure made up of corner fittings and angle bar members.

When the ductwork is assembled, the sealing strip lays flat against its counterpart of the mating duct section, thus providing an effective sealing for the entire structure of the duct.

Figure 8:
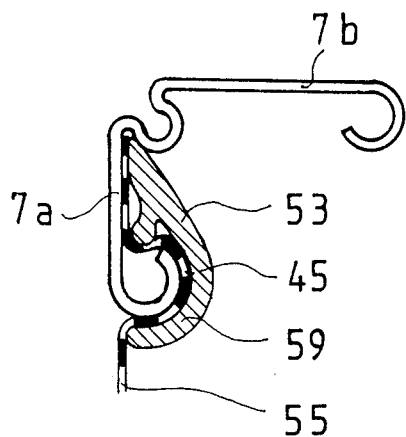
Figure 9:
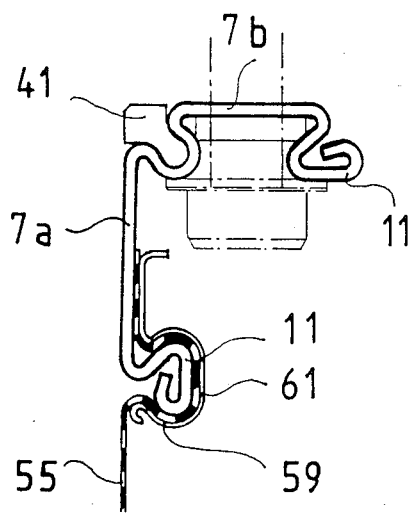

As shown in FIG. 6, the angle bar, and therefore the entire flange connector, may be anchored against the front ends of the duct edges by means of tension clamping. This is achieved by clamps in the form of pieces or bars or rods 49 made of plastic or other suitable material that clamp the enclosing walls of the duct against the parallel flange 7a all along its length from corner fitting to corner fitting or at several selected points only as needed, by means of forced pressure setting. FIGS. 7-9 show the anchoring of a duct section that is not made of solid sheeting but of flexible material or coated fabric. Such duct elements are used as dampers, also known as flexible connectors.

The clamping device in FIG. 7 consists of a wedge or lug strip 53 of an elastomeric or other suitable material that snaps into the recesses of flanges 7a or 7b as required and presses the flexible material tightly against the inner flange wall, providing a clamping connector.

FIG. 8 shows a variation of a clamping device 59 that might also be applied in form of a continuous bar that partially encircles the semicircular recessed seam of the outer longitudinal edge of the flange and has a lug-like extension that clips into the opening of the semicircular recess, resulting in a snap-on grip that anchors the flexible material to the angular section bar in such a way that the flexible material 55 is now in alignment with the outer plane of the flange 7a.

FIG. 9 shows a further variation of a device for anchoring flexible duct walls with a clamp connector in the form of a clamping bar 61 made of suitable material that provides a spring-like snap on grip lock.

From the above-mentioned descriptions it can be observed that the cross-sections of the angle bars as well as the ones of the corner fittings are suitable for the mounting of both rigid as well as flexible duct enclosing walls. The corner fitting may or may not have a suitable groove that can receive the front end edges of the mating duct walls. In the case of flexible walling however, a similar design is preferred for simplification purposes.

It can further be observed from the drawings that the angle bar members 5 are essentially symmetric to the bisecting line of the angle. This leads to production advantages and material savings due to the economic design of the section. Since the flanges 7a and 7b may also have a width different from each other, but by maintaining a mirror image, parallel flange 7a and perpendicular flange 7b remain interchangeable by simply turning the angle bar around. This makes available an angle bar that can satisfy two different requirements for the width of a perpendicular flange 7b, although one only stock item is needed. This leads to an advantage over and above the optimal sealing effect attained and increases the field of application of the described flange connector.

Finally, it is pointed out that the angle bar members terminate just before the corner formed by the duct walls, as shown in FIG. 1. Due of the described connecting method to the corner fitting, however, they may also be connected to a conventional corner fitting essentially punched out of sheet material, or the angle bars may continue to the corner of the duct enclosing walls and meet each other at a 45 degrees mitre and be connected and held together through corner pieces inserted into the various recesses of the flanges. However, by connecting the angle bar members with corner fittings that are suitably shaped in all three dimensions, both stability and sealing effect of the entire flange connector are increased in an optimal way.

Duct sections mounted with the described frame connector may be joined by bolting them together through the elongated mounting slots in the corner fittings, but they may also be connected by means of clinch-on or bolt-on clamps that encircle partially the semicircular recessed seams of two flanges when they come to lie face to face in their mounting position.

At last, it is pointed out that the angle bars connected with the corner fittings or other suitable connecting means, can also be used for the enclosure and for the support of flat walls consisting of stiff or flexible material.

What is claimed is:

1. Apparatus for joining adjacent sections of forced air heating ducts having generally rectangular profiles in cross-section, comprising:
    (a) a plurality of angle bar members arranged to be mounted on the apposed end edges of said adjacent ducts to be joined, each said angle bar member having first and second mutually perpendicular flange segments, said flange segments being provided with a generally semicircular, inwardly-projecting, indentation extending along the imaginary line of intersection of the planes in which said first and second flange segments lie and each said first and second flange segments having its outer longitudinal edge formed into an arcuate, inwardly-turned curve;
    (b) a plurality of molded corner pieces, each having a block portion having first and second generally planar major surfaces with an "L"-shaped recess formed in one corner of said first major surface thereof for receiving a corner edge of said forced air heating ducts and a pair of pluggable members projecting laterally outwardly from adjacent side edges of said block portion, said pluggable members being grooved for fitting within said arcuate, inwardly-turned curve of said first and second flanges and an arcuate groove formed in the second major surface of said block member, which when secured to the flanges of said angle bar members by said pair of pluggable members, forms a continuation of said generally semicircular inwardly projecting indentation.

2. The apparatus as in claim 1 and further including clamping means insertable within the confines of said generally semicircular, inwardly-projecting indentation extending along the imaginary line of intersection of the planes in which said first and second flange segments lie and said arcuate, inwardly-turned curve of one of said first and second flanges for wedging a wall of said duct against one of said flanges of said angle bar members.

3. The apparatus as in claim 1 and further including a sealing strip fitted within said arcuate groove formed in the second major surface of said block member and through said generally semicircular, inwardly-projecting indentation of the angle bar members joined by said corner pieces.

4. The apparatus as in claim 3 wherein said sealing strip has two sealing surfaces which, when compressed, are in alignment with the outer surfaces of said first and second mutually perpendicular flange segments.

5. Apparatus as in claim 1 and further including clamping means for anchoring duct sections formed from flexible material.

6. Apparatus as in claim 5 wherein said clamping means is wedged between a surface of said generally semicircular inwardly-projecting indentation and said arcuate, inwardly-turned curve extending along the outer longitudinal edge of said flange.

7. The apparatus as in claim 5 wherein said clamping means comprises a spring-like bracket for securing a flexible wall duct to said arcuate, inwardly-turned curved outer longitudinal edge of said flange member.

8. The apparatus as in claim 1 wherein said first and second mutually perpendicular flange segments are of differing widths.

9. Apparatus as in claim 1 wherein said corner pieces are formed by a molding or casting process.

* * * * *